United States Patent
Liu (10) Patent No.: US 6,496,320 B1
(45) Date of Patent: Dec. 17, 2002

(54) ADAPTIVE ATTENUATION OF MULTI-AXIS VIBRATIONAL DISTURBANCE

(75) Inventor: Zhiqiang Liu, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 272 days.

(21) Appl. No.: 09/663,760

(22) Filed: Sep. 15, 2000

Related U.S. Application Data (60) Provisional application No. 60/181,174, filed on Feb. 9, 2000.

(51) Int. Cl.$^7$ .............................................. G11B 21/02
(52) U.S. Cl. ...................... 360/75; 360/290; 360/294.7
(58) Field of Search ....................... 360/75, 70, 290, 360/294.7; 318/560; 381/71.8

(56) References Cited

U.S. PATENT DOCUMENTS

| | | | |
|---|---|---|---|
| 3,810,236 A | | 5/1974 | Horowitz et al. |
| 4,599,717 A | | 7/1986 | Bracht et al. |
| 4,881,172 A | * | 11/1989 | Miller ........................ 701/37 |
| 4,947,093 A | * | 8/1990 | Dunstan et al. ............. 318/560 |
| 5,235,472 A | | 8/1993 | Smith |
| 5,255,270 A | | 10/1993 | Yanai et al. |
| 5,289,478 A | | 2/1994 | Barlow et al. |
| 5,422,760 A | | 6/1995 | Abbott et al. |
| 5,471,351 A | | 11/1995 | Ishiguro |
| 5,475,665 A | | 12/1995 | Tani et al. |
| 5,532,992 A | | 7/1996 | Funamoto |
| 5,553,847 A | | 9/1996 | Surrency |
| 5,663,847 A | | 9/1997 | Abramovitch |
| 5,717,673 A | | 2/1998 | Ohkubo |
| 5,734,246 A | * | 3/1998 | Falangas ..................... 318/649 |
| 5,796,849 A | * | 8/1998 | Coleman et al. ........... 381/71.8 |
| 6,402,089 B1 | * | 6/2002 | Kiss et al. ................ 244/17.27 |

OTHER PUBLICATIONS

"Increased Disturbance Rejection in Magnetic Disk Drives by Acceleration Feedfoward Control;" 13$^{th}$ Triennial World Congress, San Francisco, U.S.A., 1996.
"Increased Disturbance Rejection for Hard Disk Drives using Accelerometers;" Pannu and Horowitz; Computer Mechanics Laboratory, Department of Mechanical Engineering, University of Berkely, CA, 1998.

\* cited by examiner

*Primary Examiner*—David Hudspeth
*Assistant Examiner*—Fred F. Tzeng
(74) *Attorney, Agent, or Firm*—Fellers, Snider, et al.

(57) ABSTRACT

Apparatus and method for attenuating effects of externally generated vibration applied along multiple axes of a disc drive. The disc drive includes a disc with a recording surface, a read/write head and a servo circuit which detects and corrects head position error. The servo circuit determines a plant estimate indicative of transfer function response of the disc drive while the disc drive is operated off-line. A sensor network concurrently generates a plurality of acceleration signals each along a different axis of the disc drive and indicative of a different component of the externally generated vibration applied along the corresponding axis. An adaptive filter network adaptively filters the acceleration signals to generate a compensation signal. The compensation signal is fed forward to the servo circuit to remove the effects of the externally generated vibration.

13 Claims, 6 Drawing Sheets

ADAPTIVE ATTENUATION OF MULTI-AXIS VIBRATIONAL DISTURBANCE

RELATED APPLICATIONS

This application claims priority to Provisional Application No. 60/181,174 filed Feb. 9, 2000.

FIELD THE INVENTION

This invention relates generally to the field of magnetic data storage devices, and more particularly, but not by way of limitation, to improving disc drive operational performance by adaptively attenuating the effects of vibrational inputs which are simultaneously applied to a disc drive along multiple axes.

BACKGROUND

Disc drives are used as primary data storage devices in modern computer systems. A typical disc drive includes one or more axially aligned discs that are rotated at a high speed by a spindle motor. A corresponding array of read/write transducing heads are supported adjacent the discs and used to transfer data between the discs and a host computer in which the disc drive is mounted.

Each disc surface is provided with prerecorded servo data arranged as a plurality of servo fields which are written during disc drive manufacturing. The servo data define a plurality of concentric tracks on each surface and are decoded to provide head position and velocity information to a servo control circuit configured to controllably position the heads adjacent the tracks. Each track further includes a plurality of user data fields, or sectors, to which user data are written and from which user data are subsequently read by the heads. All of the tracks on each of the disc surfaces at a given radius collectively make up a cylinder.

During a track following mode in which a selected head is maintained over a corresponding track, the servo control circuit transduces the servo data to determine the actual position of the head relative to the track and generates a position error signal (PES) indicative of the difference between the actual position and a desired position (such as over the center of the track). In response to the magnitude of the PES, the servo control circuit provides a current command signal to a power amplifier which applies current to an actuator motor, such as a voice coil motor (VCM), to adjust the position of the head to remove the position error.

There exists a continued demand in the marketplace for drives with ever higher data capacities, at lower cost. Disc drive manufacturers have responded by providing successive generations of drives with higher data storage areal densities (i.e., the amount of data stored per unit area), resulting in significant annual increases in data track densities (greater than 60% per year in recent years). As individual tracks become narrower and closer together, greater demands are placed on servo control circuits to maintain the heads over the tracks during track following modes of operation, especially in the presence of external vibrations. Such vibrations can be generated through the operation of adjacent drives, such as in a multi-drive array, and transmitted from drive to drive through chassis mounts used to secure the drives within the array.

Vibrational components are typically characterized as translational, or rotational. Translational vibrations tend to move a disc drive housing back and forth along a selected axis parallel to the discs, whereas rotational vibrations tend to rotate a disc drive housing about an axis parallel to the axis of disc rotation. Translational vibrations will generally have a smaller effect upon the ability of the servo control circuit to maintain the heads at a selected position with respect to the discs, as the discs and the actuator will both respond to the movement induced by such translational vibrations. Particularly, disc drive designers typically attempt to provide balanced actuators to minimize actuator rotation during a translational vibration disturbance.

However, such is not true with rotational vibrations. Even with a nominally balanced actuator, rotational vibrations will tend to move the discs relative to the actuator because the actuator, acting as a free body, remains essentially undisturbed due to inertial effects while the discs, mounted to the housing, are displaced by imparted rotational vibration. When sufficiently severe, such movement will cause an "off-track" condition whereby a head is moved away from a selected track being followed. Such off-track conditions can adversely affect the ability of the drive to transfer data between the discs and host device.

The problems associated with rotational vibration are well known in the disc drive art. Compensation attempts have included use of sensors that can detect the presence of rotational vibration in a disc drive, such as discussed in U.S. Pat. No. 5,235,472 issued to Smith, assigned to the assignee of the present invention. Efforts to both detect and compensate rotational vibration using feedforward control include U.S. Pat. No. 5,663,847 issued to Abramovitch; White and Tomizuka, *Increased Disturbance Rejection in Magnetic Disk Drives by Acceleration Feedforward Control*, $13^{th}$ Triennial World Congress, San Francisco, U.S.A., 1996; and Pannu and Horowitz, *Increased Disturbance Rejection for Hard Disc Drives using Accelerometers*, Computer Mechanics Laboratory, Department of Mechanical Engineering, University of Berkeley, Calif., 1998.

While operative, these and other references are generally directed to detecting and compensating external vibrations along one-dimension at a time. In practice, induced vibration is seldom purely rotational or translational along one axis, but rather is presented as a composite disturbance along multiple axes. Hence, there is a continued need in the art for an improved approach to attenuating the effects of external vibration along multiple axes, and it is to such improvements that the present invention is directed.

SUMMARY OF THE INVENTION

The present invention is directed to an apparatus and method for improving disc drive operational performance by attenuating effects of externally generated vibration applied along multiple axes of a disc drive.

In accordance with preferred embodiments, the disc drive includes a base deck, a rotatable disc supported by the base deck with a recording surface on which a plurality of concentric data tracks are defined, and a read/write head which accesses the data tracks. An actuator motor controllably moves the head relative to the recording surface, and a servo circuit generates a position error signal indicative of head position error in relation to detected head position and desired head position.

In accordance with a preferred embodiment, the servo circuit is configured to determine a plant estimate indicative of transfer function response of the disc drive while the disc drive is operated off-line. The disc drive is further provided with a sensor network having a plurality of vibration sensors, each vibration sensor configured to generate an acceleration signal aligned along different disc drive axes, indicative of a different component of the externally generated vibration applied along the corresponding axis of the disc drive.

An adaptive filter network has a plurality of filters arranged in parallel, each filter adaptively filtering a selected one of the acceleration signals to generate a filtered acceleration signal. The adaptive filter network combines the filtered acceleration signal to generate a compensation signal which is used by the servo circuit to reduce head position error induced by the externally generated vibration. Each adaptive filter is preferably characterized as an adaptive multi-tap finite response filter (FIR) having tap weights selected in response to the plant estimate and the externally generated vibration.

These and other features and advantages which characterize the present invention will be apparent from a reading of the following detailed description and a review of the associated drawings.

DETAILED DESCRIPTION

Figure 1:
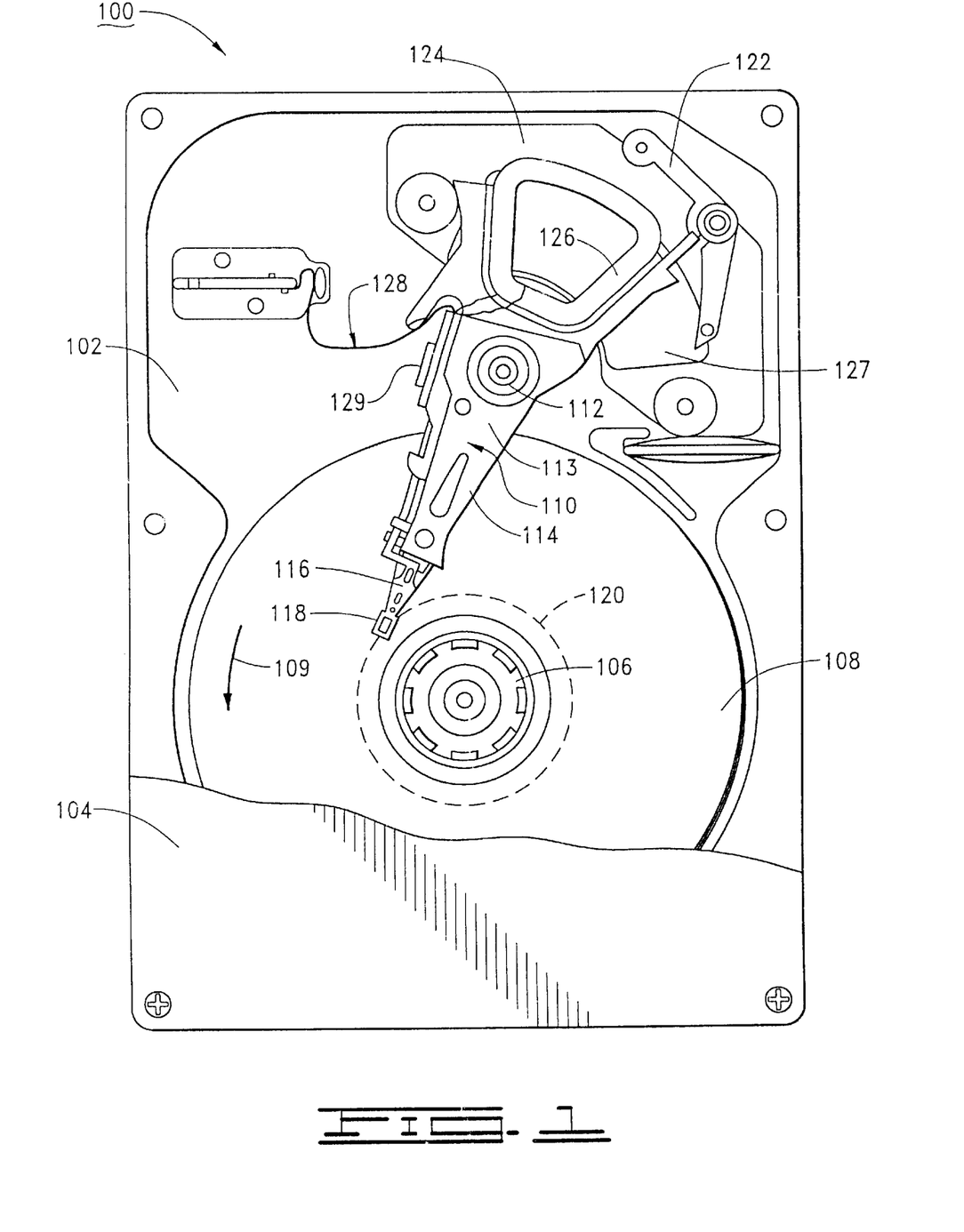
FIG. 1 is a top plan view of a disc drive constructed in accordance with preferred embodiments of the present invention.

In order to provide a detailed description of various preferred embodiments of the present invention, reference is first made to FIG. 1, which provides a top plan view of a disc drive 100 of the type used to interface with a host computer to magnetically store and retrieve user data. The disc drive 100 includes a base deck 100 to which various components of the disc drive 100 are mounted. A top cover 104 (shown in partial cutaway fashion) cooperates with the base deck 102 to form an internal, sealed environment for the disc drive.

A spindle motor (shown generally at 106) is provided to rotate a plurality of axially-aligned, rigid, magnetic recording discs 108 at a constant speed in rotational direction 109. User data are written to and read from tracks (not designated) on the discs 108 through the use of an actuator 110, which rotates about a bearing shaft assembly 112 positioned adjacent the discs 108.

The actuator 110 includes an actuator body 113 from which a plurality of rigid actuator arms 114 extend. A plurality of flexible suspension assemblies 116 (flexures) are attached to the distal end of the actuator arms 114. A head 118 is mounted at the distal end of each of the flexures 116 and includes a slider assembly (not separately designated) designed to fly in close proximity to the corresponding surface of the associated disc 108. When the disc drive 100 is deactivated, the heads 118 come to rest on texturized landing zones 120 and the actuator 110 is secured using a magnetic latch 122.

The actuator 110 is rotated using a voice coil motor (VCM) 124, which includes an actuator coil 126 and permanent magnet 127. A flex circuit assembly 128 provides electrical communication paths between the actuator 110 and a disc drive printed circuit board assembly (PCBA) mounted to the underside of the base deck 102. The flex circuit assembly 128 includes a preamplifier/driver circuit 129 ("preamp") which applies currents to the heads 118 to read and write data.

Figure 2:
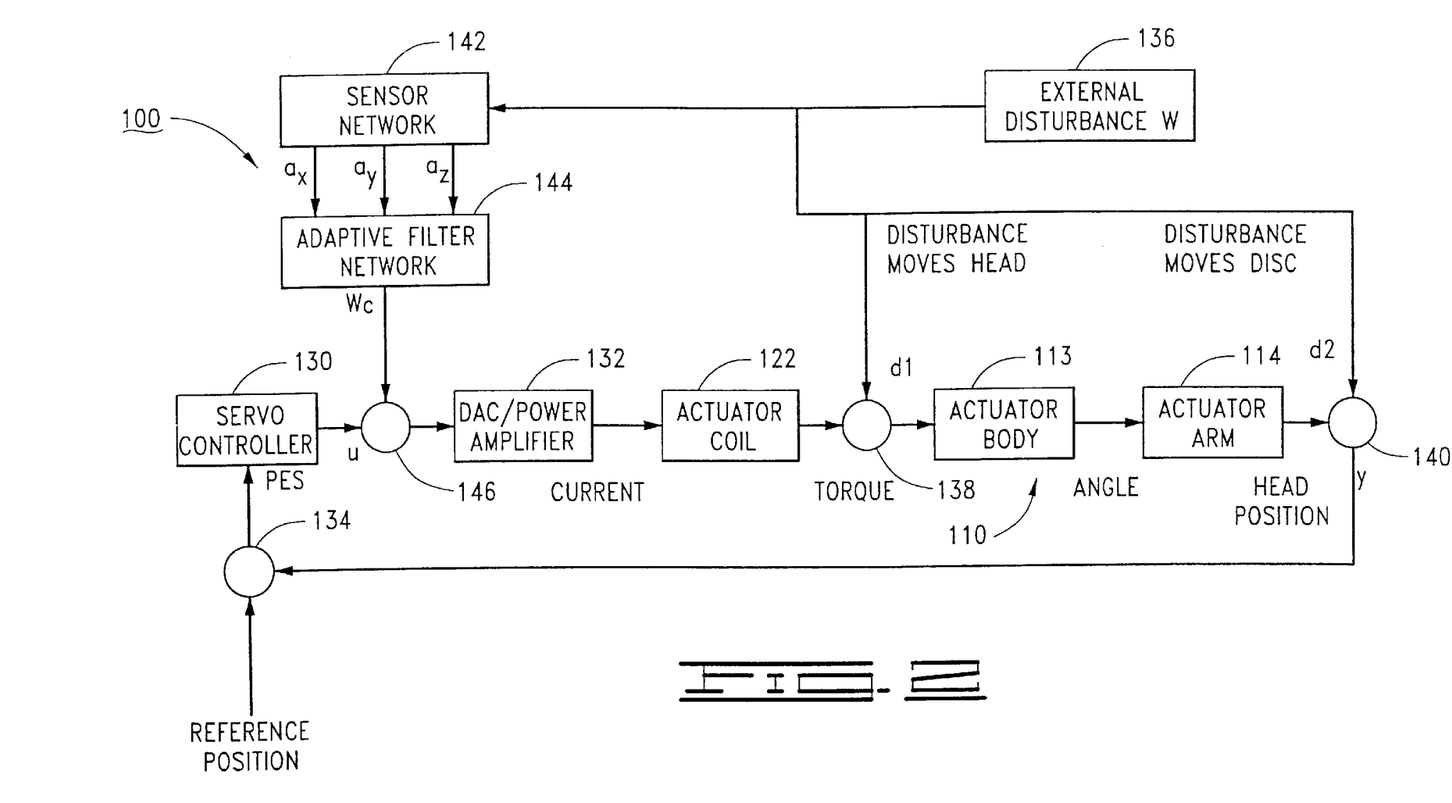
FIG. 2 is a functional block diagram of a servo control circuit of the disc drive, illustrating the use of a sensor network and an adaptive filter network to attenuate the effects of externally generated vibrational disturbances which are presented along multiple axes.

FIG. 2 provides a functional block diagram of the disc drive 100 to illustrate the general manner in which the present invention, as embodied herein, operates to attenuate external vibration along multiple axes. During a track following mode of operation, a servo controller 130 receives a position error signal (PES) as a difference between an actual head position and a reference position. In response, the controller 130 applies a current command signal u to a digital to analog converter (DAC) and power amplifier circuit 132, which in turn applies current to the actuator 110. The actuator 110 is broken down into representative component blocks as follows: the coil 122, the actuator body 113, and the actuator arm 114. Application of current to the coil 122 induces torque on the actuator body 113, which correspondingly induces an angular change in the arm 114. Servo data on the associated disc are transduced and used to indicate head position y which is summed at summing junction 134 with the aforementioned reference position input to generate the PES input.

Externally generated vibration along multiple axes is represented at block 136, and this vibration (having both translational and rotational components) adversely affects the system by tending to induce torque to move the head 118 relative to the disc 108 (signal d1, summed at summing junction 138), as well as inducing torque to move the disc 108 relative to the head 118 (signal d2, summed at summing junction 140).

To compensate for the effects of this externally generated vibration, a sensor network 142 detects the vibration and outputs a plurality of acceleration signals for each of a corresponding plurality of axes of the disc drive, each acceleration signal indicative of the acceleration component along each axis. In a preferred embodiment, the sensor network 142 generates acceleration signals $a_x$, $a_y$ and $a_z$, with acceleration signal $a_x$ indicative of translational acceleration along an x-axis (length of the drive), $a_y$ indicative of translational acceleration along a y-axis (width of the drive), and $a_z$ indicative of rotational vibration about a z-axis (parallel to the axis of disc rotation). The acceleration signals are in turn provided to an adaptive filter network 144 which, as discussed below, adaptively filters the respective acceleration signals to present a compensation signal Wc which, when summed with the current command signal at summing junction 146, generates a compensated current command signal that reduces the effects of the disturbance signals d1 and d2.

Figure 3:
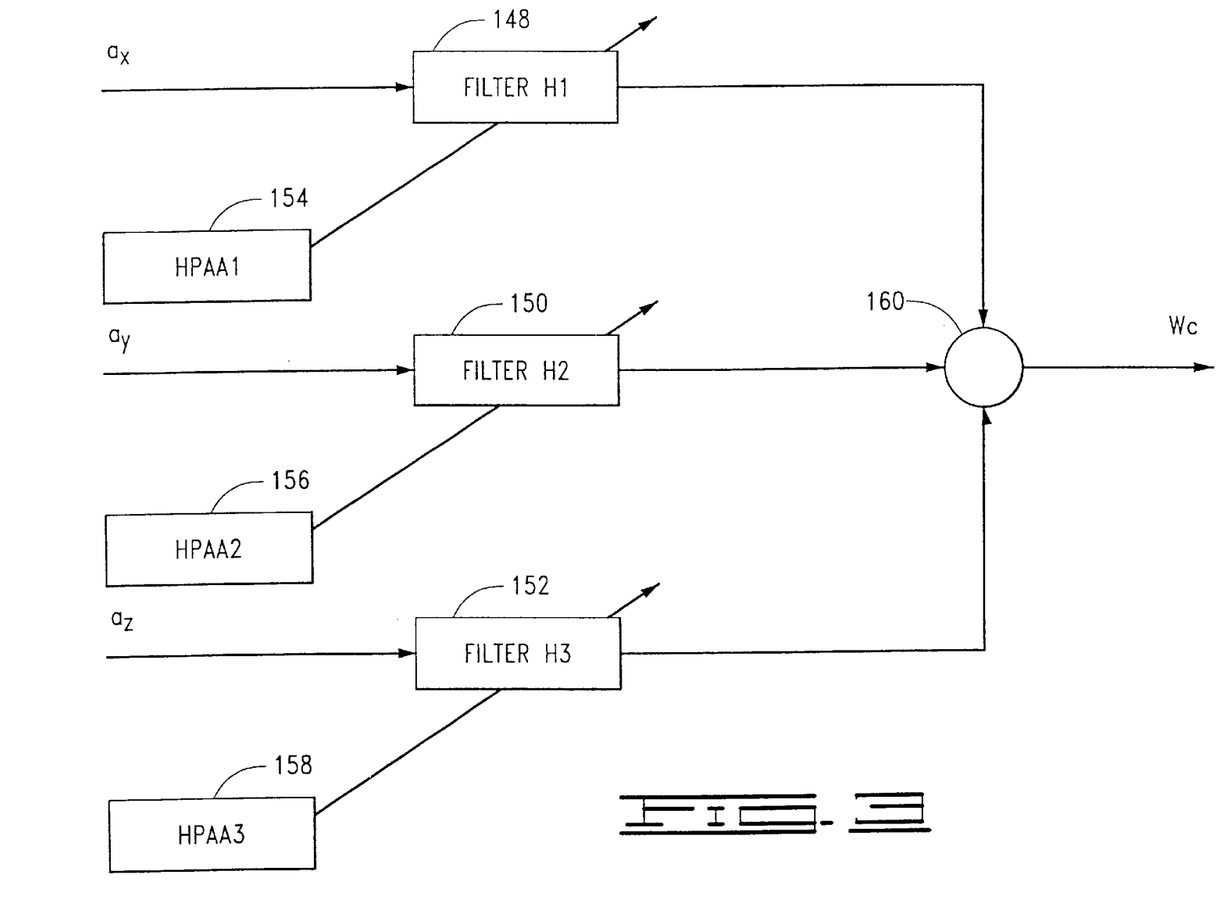
FIG. 3 provides a functional block diagram of a preferred embodiment for the adaptive filter network of FIG. 2.

FIG. 3 provides a schematic block diagram of the filter network 144 in accordance with a preferred embodiment. The filter network includes three multi-tap finite impulse response (FIR) filters 148, 150 and 152, denoted as H1, H2 and H3, respectively. The filters operate in parallel as feedforward controllers to simultaneously attenuate the $a_x$, $a_y$ and $a_z$ signals. The filters are adapted by a corresponding set of parameter adaptation algorithm (PAA) blocks, denoted HPAA1 154, HPAA2 156 and HPAA3 158, respectively. The outputs of the filters 148, 150 and 152 are in turn summed at summing junction 160 to present the compensation signal Wc. It will be noted that the filters can be constructed using hardware (such as a programmable field gate array) or firmware (such as programming used by the servo controller 130).

The filter adaptation can be performed in a number of ways, depending upon the requirements of a given application. For example, as discussed by the aforementioned Pannu et al. reference, incorporated herein by reference, a Stochastic Gradient Algorithm (SGA) is a particularly useful adaptation methodology since the stochastic disturbance function is not measurable and the plant parameters are unknown. This approach involves an off-line identification of the plant and noise model polynomials, after which the FIR tap weights can be adaptively determined during operation. Such adaptation methodologies are well known in the art, so the following description is provided for purposes of completeness.

Plant adaptation can be performed as follows. Using standard notation, the plant estimate can be stated as:

$$\hat{\theta}(k) = \hat{\theta}(k-1) + \frac{\phi(k-1)}{r_0(k-1)}(y(k) - \hat{y}(k)) \qquad (1)$$

where $\hat{y}(k)=\phi(k-1)^T\hat{\theta}(k-1)$ $\phi(k-1)^T=(y(k-1), \ldots ,y(k-\hat{n}_u),u(k-n_d), \ldots ,u(k-n_n-\hat{n}_h),$
$\quad \eta(k-1), \ldots -\eta(k-\hat{n}_c))\ \eta(k)=y(k)-\phi(k-1)^T\hat{\theta}(k-1)$ $r_\theta(k-1)=r_\theta(k-2)+\lambda_\theta\phi(k-1)^T\phi(k-1);$ where $r_\theta(-1)=r_{\theta 0}>0$ and $0<\lambda_\theta\leq 1$ $\hat{\theta}^T(k)=(\hat{a}_1(k), \ldots \hat{a}_{na}(k), \hat{b}_0(k), \ldots ,\hat{b}_{nh}(k), \hat{c}_1(k), \ldots ,\hat{c}_{nc}(k))$ $\theta_0^T(k)=(a_1, \ldots ,a_{na}, b_0, \ldots ,b_{nb}, \ldots ,c_1, \ldots , c_{nc}).$ and $n_d$ is the time delay of the plant. The estimated disturbance is given by:

$$\hat{d}(k) = y(k) - \bar{y}(k) \qquad (2)$$

$$\bar{y}(k) = \frac{\hat{B}(k, q^{-1})}{\hat{A}(k, q^{-1})}u(k)$$

where $\hat{A}(k,q^{-1})=1+\hat{a}_1(k)q^{-1}+\ldots+\hat{a}_{na}(k)q^{-\hat{n}a} \qquad (3)$ $\hat{B}(k,q^{-1})=b_0+\hat{b}_1(k)q^{-1}+\ldots+\hat{b}_{nh}(k)q^{-\hat{n}h}$ Generally, the plant estimates will not vary in response to the external disturbance, but can vary due to changes in environmental conditions and other factors that affect the disc drive over time. Plant estimates will also vary from drive to drive. Hence, the plant adaptation is preferably performed in an off-line fashion during disc drive manufacturing, and then periodically from time to time during field operation of the drive as desired. The adaptation is preferably carried out by the servo controller 130.

Once the plant estimates are obtained, the next step is adaptation of the FIR filters 148, 150, 152 (FIG. 3). The manner in which the acceleration signals $a_x$, $a_y$ and $a_z$ are preferably determined will be discussed shortly, but at this point it will be understood that such signals are available to perform the following calculations:

$$\hat{A}(k,q^{-1})\hat{x}_i(k)=\hat{B}(k,q^{-1})\hat{a}_i(k); \text{ where } i\epsilon(x,y,z) \qquad (4)$$

The parameters and regression vectors for the filters 148, 150, 152 are:

$$\hat{H}_i(k)=[\hat{h}_{i0}(k),\hat{h}_{i1}(k), \ldots , \hat{h}_{ni}(k)]; \text{ where } i\epsilon(x,y,z) \qquad (5)$$

$$\hat{X}_i(k)=[\hat{x}_i(k),\hat{x}_i(k-1), \ldots ,\hat{x}_i(k-\hat{n}_{hi})] \qquad (6)$$

Thus, the adaptation of the FIR filters is given by:

$$\hat{H}_i(k) = \hat{H}_i(k-1) + \frac{\hat{X}_i(k-1)}{r_h(k-1)}\eta_h(k) \qquad (7)$$

$\eta_h(k)=\hat{d}(k)-\hat{X}_i(k-1)^T\hat{H}_i(k-1)$ $r_{hi}(k-1)=r_{hi}(k=2)+\lambda_{hi}\hat{X}_i(k-1)^T\hat{X}_i(k-1);$ where $r_{hi}(-1)=r_{ni0}>0$ and $0<\lambda_{hi}\leq 1$ The adaptation preferably occurs continuously during disc drive operation.

Figure 4:
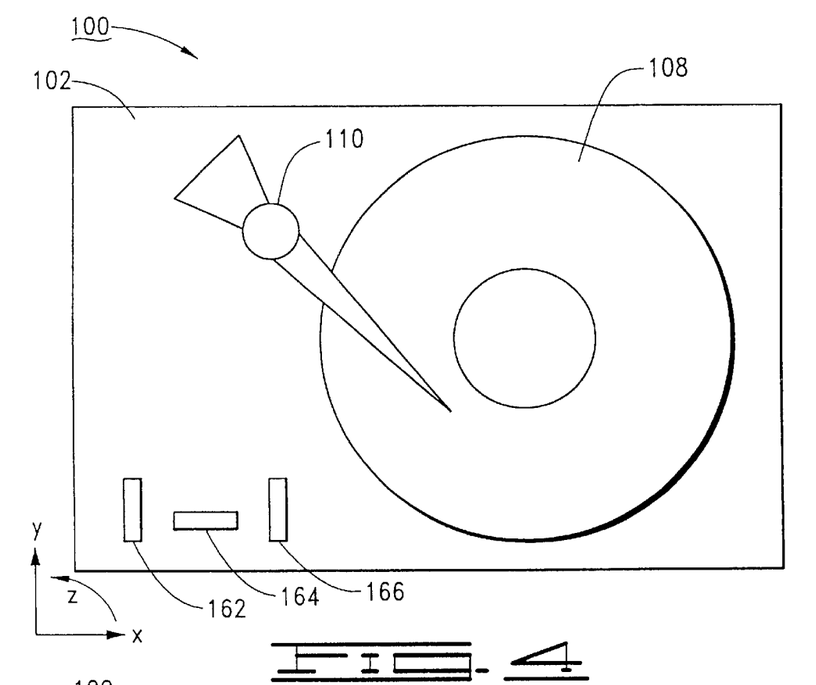
FIG. 4 provides a schematic diagram of the disc drive, illustrating a preferred arrangement of three vibration sensors on a base deck of the drive, the vibration sensors forming a portion of the sensor network of FIG. 2.

Reference is now made to FIG. 4, which provides a schematic diagram of the disc drive 100 of FIG. 1 and shows three acceleration sensors 162, 164 and 166, respectively (also referred to as "Sensors 1, 2 and 3"). The sensors are preferably characterized as linear accelerometers, although other constructions for the sensors are readily envisioned. The sensors are preferably affixed to the base deck 102 in the orientation shown. Placing the sensors within the enclosed environment formed by the base deck 102 and 104 advantageously protects the sensors from environmental conditions, such as excessive moisture, which can degrade performance. Of course, the sensors 162, 164, 166 can alternatively be placed elsewhere, such as on the disc drive PCB mounted to the underside of the base deck 102.

Figure 5:
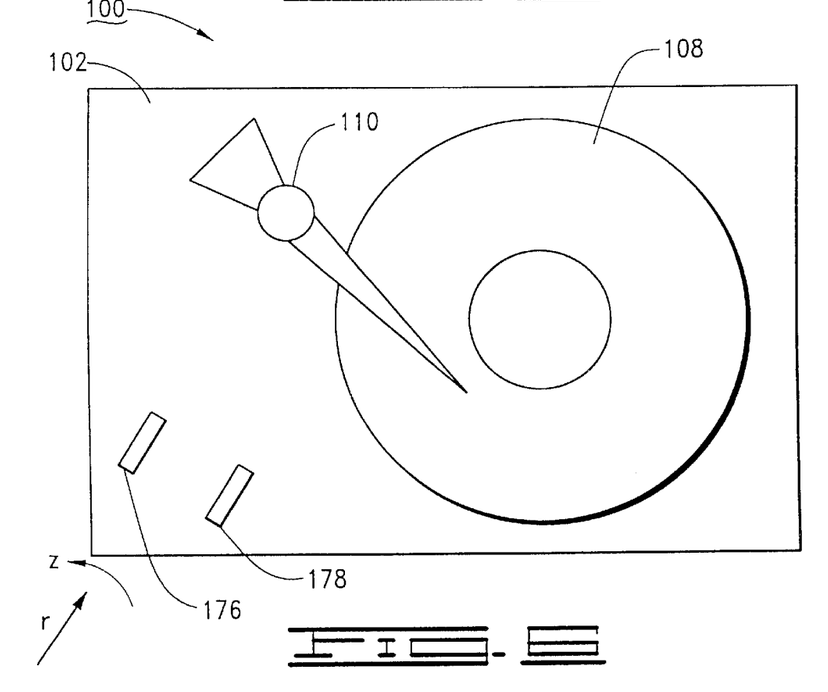
FIG. 5 is a functional block diagram of the sensor network incorporating the three sensors of FIG. 4.

It will be noted that the sensors 162 and 166 are aligned substantially along the y-axis, while the sensor 164 is aligned substantially along the x-axis. As shown in FIG. 5, the output from the sensor 164 provides the $a_x$ acceleration signal, the output from the sensor 162 provides the $a_y$ acceleration signal, and the combination of the outputs of the sensors 162, 166 (at summing junction 168) provides the $a_z$ acceleration signal. Analog to digital converters (ADCs) 170, 172 and 174 convert the respective acceleration signals to digital form for use by the adaptive filter network 144. Although not shown, it will be understood that additional gain blocks can be utilized as desired to account for interpart variations in sensor gain.

Figure 6:
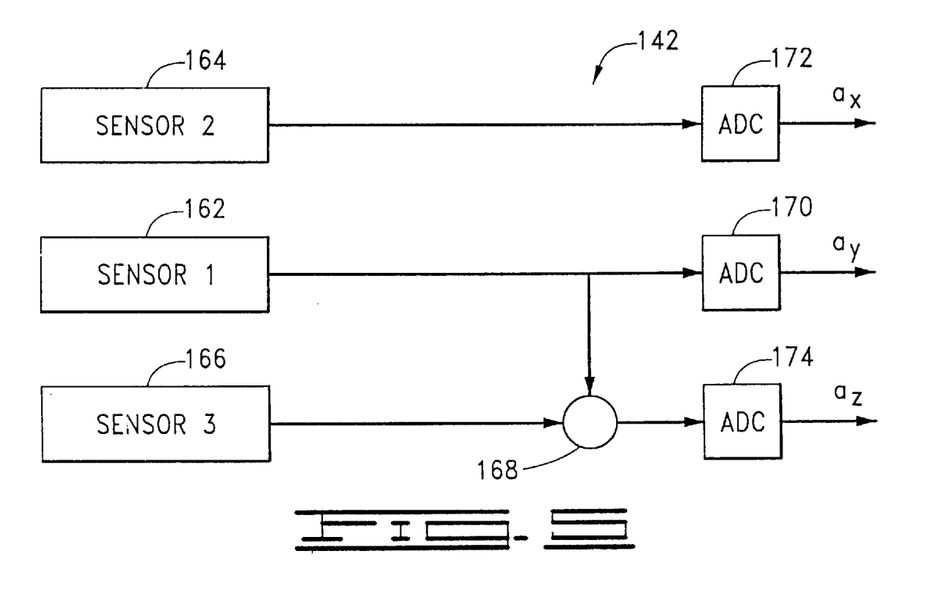
FIG. 6 provides an alternative schematic diagram of the disc drive, showing another preferred arrangement of two vibration sensors on the base deck.
Figure 7:
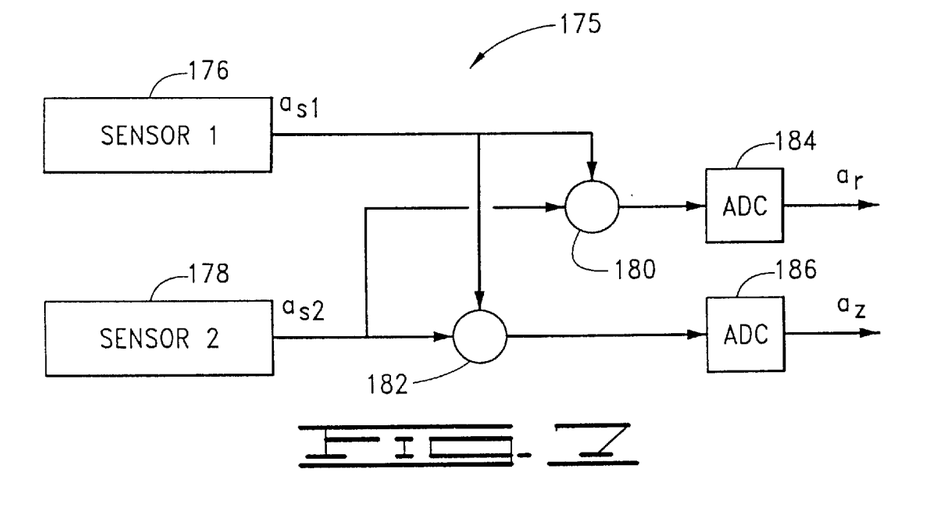
FIG. 7 is a functional block diagram of the sensor network incorporating the two sensors of FIG. 5.

In an alternative embodiment, a sensor network 175 is provided with two sensors instead of three, as illustrated by FIGS. 6 and 7. More particularly, FIG. 6 provides a schematic representation of the disc drive 100, and includes two sensors 176, 178 mounted to the base deck 102 as shown. The sensors are angled with respect to the x and y axes of FIG. 5. The sensors 176, 178 (also referred to as "Sensors 1 and 2") are preferably configured to generate a translational acceleration signal $a_r$ (along direction r toward the actuator pivot) and a rotational acceleration signal $a_z$ (about an axis parallel to the actuator pivot) using the following relations:

$$a_r = \frac{1}{2}(a_{S1} + a_{S2}) \quad (8)$$

$$a_z = \frac{1}{m}(a_{S2} - a_{S1})$$

where $a_{S1}$ is the output from sensor 176, $a_{S2}$ is the output from sensor 178, and m is the distance between sensors 176, 178. As shown in FIG. 7, summing junctions 180, 182 can be advantageously programmed to combine the output signals to provide the $a_r$ and $a_z$ acceleration signals. As before, ADCs 184, 186 are preferably provided to convert the acceleration signals to digital form. It will be noted that the corresponding adaptive filter network (not shown) will include only two filter stages to attenuate the $a_r$ and $a_z$ acceleration signals, but the network will otherwise operate as described above. Other numbers of acceleration signals and configurations of sensors are readily contemplated, depending on the requirements of a given application.

Figure 8:
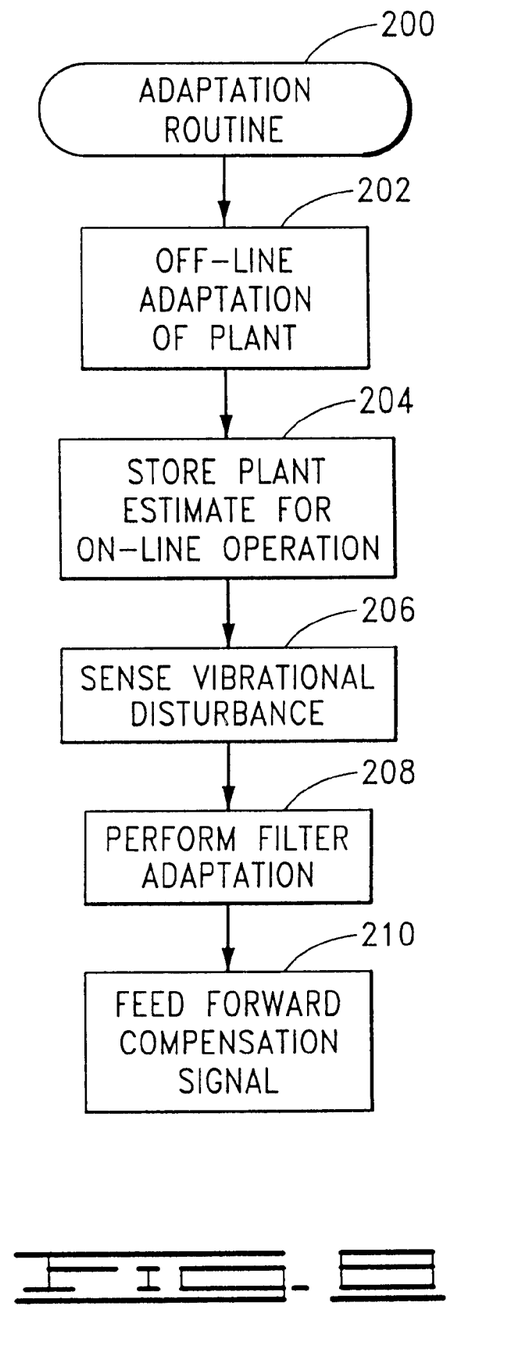
FIG. 8 provides a flow chart for an ADAPTATION ROUTINE, representative of steps carried out by the disc drive to attenuate multi-axis vibration in accordance with preferred embodiments.

FIG. 8 provides a flow chart for an ADAPTATION ROUTINE 200, representative of steps carried out in accordance with the foregoing discussion. At step 202, plant adaptation is performed to obtain plant estimates while the disc drive 100 is off-line. As discussed above, this step is carried out initially during disc drive manufacturing, and thereafter on a periodic basis at appropriate times, such as during idle times when no host commands are pending. The resulting transfer functions are stored at step 204.

Thereafter, during normal operation the sense network 142, 175 operates to measure externally generated vibration along multiple axes and provide acceleration signals to the filter network 144, step 206. The filter network uses the acceleration signals to continuously adapt the filter response and also operates upon the acceleration signals to generate a compensation signal Wc at step 208. The compensation signal is fed forward into the servo loop, step 210, to compensate for the effects of the external disturbance.

One aspect of the present invention is directed to an apparatus for attenuating effects of externally generated vibration applied along multiple axes of a disc drive 100. The disc drive includes a base deck 102; a rotatable disc 108 supported by the base deck with a recording surface on which a plurality of concentric data tracks are defined; a read/write head 118 adjacent the recording surface; an actuator motor 124 which controllably moves the head relative to the recording surface; a servo circuit 130, 132, 134, 140 which generates a position error signal indicative of head position error in relation to detected head position and desired head position, the servo circuit determining a plant estimate indicative of transfer function response of the disc drive while the disc drive is operated off-line; a sensor network 142 coupled to the base deck and comprising a plurality of vibration sensors 162, 164, 168, 176, 178, each vibration sensor configured to generate an acceleration signal along a corresponding orthogonal axis of the disc drive, each acceleration signal indicative of a different component of the externally generated vibration applied along the corresponding axis of the disc drive; and an adaptive filter network 144 coupled to the sensor network and comprising a plurality of filters 148, 150, 152, arranged in parallel, each filter adaptively filtering a selected one of the acceleration signals to generate a filtered acceleration signal in response to the plant estimate and the externally generated vibration, the adaptive filter network combining the filtered acceleration signal to generate a compensation signal which is used by the servo circuit to reduce head position error induced by the externally generated vibration.

In another aspect of the present invention, the servo circuit further generates a current command signal in response to the position error signal, combines the current command signal with the compensation signal to generate a compensated current command signal, and uses the compensated current signal to apply current to the actuator motor to nominally remove the head position error.

In another aspect of the present invention, the array of vibration sensors comprises first, second and third vibration sensors 162, 164, 166, the first vibration sensor aligned along an axis corresponding to a length of the disc drive, the second vibration sensor aligned along an axis corresponding to a width of the disc drive, and the third vibration sensor aligned nominally parallel to a selected one of the first or second vibration sensors so that translational acceleration components of the externally generated vibration are detected by the first and second vibration sensors and a rotational acceleration component of the externally generated vibration is detected by the third vibration sensor and the selected one of the first or second vibration sensors.

In another aspect of the present invention, the array of vibration sensors comprises first and second vibration sensors 176, 178, the first vibration sensor aligned nominally parallel to the second vibration sensor so that both a translational acceleration component and a rotational acceleration component of the externally generated vibration are detected by combined operation of the first and second vibration sensors.

In another aspect of the present invention, each adaptive filter 148, 150, 152 comprises an adaptive multi-tap finite response filter (FIR) having tap weights selected in response to the plant estimate and the externally generated vibration to attenuate the corresponding component of the externally generated vibration along the corresponding axis.

Another aspect of the present invention is directed to a method for attenuating effects of externally generated vibration applied along multiple axes of the disc drive 100, including steps of (a) determining a plant estimate indicative of transfer function response of the disc drive while the disc drive is operated off-line, step 202; (b) concurrently generating a plurality of acceleration signals along each of a corresponding plurality of different orthogonal axes of the disc drive, each acceleration signal indicative of a different component of the externally generated vibration applied along the corresponding axis of the disc drive, step 206; (c) generating a compensation signal by adaptively filtering each of the acceleration signals in parallel and summing the resulting filtered acceleration signals, step 208; and (d) using the compensation signal to reduce effects of the externally generated vibration in the position error signal, step 210.

In another aspect of the present invention, the concurrently generating step (b) comprises steps of mounting an array of vibration sensors to the disc drive along the different axes of the disc drive, and using each sensor to generate a corresponding one of the acceleration signals.

In another aspect of the present invention, the generating step (c) comprises steps of providing an array of adaptive multi-tap finite response filters (FIRs), and using each FIR to filter a different one of acceleration signals. In a related aspect of the present invention, the generating step (c) further comprises a step of using the plant estimate and the externally generated vibration to adaptively select tap weights for the FIRs during operation of the disc drive.

In another aspect of the present invention, the using step (d) comprises steps of generating a current command signal in response to the position error signal to remove head position error, combining the compensation signal with the current command signal to form a compensated current command signal, and using the compensated current command signal to adjust current applied to an actuator motor to adjust the position of the head.

For purposes of the appended claims, the term "length" will be understood to comprise a dimension along the longest extent of the disc drive substantially parallel to a plane of the disc recording surface and a side of the disc drive, and the term "width" will comprise the extent of the disc drive normal to the length and substantially parallel to the plane of the disc recording surface. The term "adaptively filter" and similar terms will be understood to comprise signal modification that changes (i.e., adapts) over time in response to the stated control inputs. This is exemplified by the adaptation of the FIR tap weights discussed herein.

Reference to the claimed "means for attenuating effects" will be understood to explicitly refer to the structure of FIGS. 2–7 and will explicitly exclude as nonequivalents other structures that only apply compensation along one axis and fail to carry out parallel, separate adaptation in multiple axes, such as for example, the U.S. Pat. Nos. 5,235,472 and 5,663,847 and the White, et al. and Pannu, et al. references discussed herein.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a disc drive having a rotatable disc with a recording surface on which a plurality of concentric data tracks are defined, a controllably positionable head adjacent the recording surface, and a servo circuit which generates a position error signal in relation to a difference between detected position of the head and a desired position of the head, a method for attenuating externally generated vibration which is applied to the disc drive along multiple axes, comprising steps of:
   (a) determining a plant estimate indicative of transfer function response of the disc drive while the disc drive is operated off-line;
   (b) concurrently generating a plurality of acceleration signals along each of a corresponding plurality of different axes of the disc drive, each acceleration signal indicative of a different component of the externally generated vibration applied along the corresponding axis of the disc drive;
   (c) generating a compensation signal by adaptively filtering each of the acceleration signals in parallel and summing the resulting filtered acceleration signals; and
   (d) using the compensation signal to reduce effects of the externally generated vibration in the position error signal.

2. The method of claim 1, in which the concurrently generating step (b) comprises steps of mounting an array of vibration sensors to the disc drive along the different axes of the disc drive, and using each sensor to generate a corresponding one of the acceleration signals.

3. The method of claim 2, in which the array of vibration sensors of concurrently generating step (b) comprises first, second and third vibration sensors, the first vibration sensor aligned along an axis corresponding to a length of the disc drive, the second vibration sensor aligned along an axis corresponding to a width of the disc drive, and the third vibration sensor aligned nominally parallel to a selected one of the first or second vibration sensors so that translational acceleration components of the externally generated vibration are detected by the first and second vibration sensors and a rotational acceleration component of the externally generated vibration is detected by the third vibration sensor and the selected one of the first or second vibration sensors.

4. The method of claim 2, in which the array of vibration sensors of concurrently generating step (b) comprises first and second vibration sensors, the first vibration sensor aligned nominally parallel to the second vibration sensor so that both a translational acceleration component and a rotational acceleration component of the externally generated vibration are detected by combined operation of the first and second vibration sensors.

5. The method of claim 1, in which the generating step (c) comprises steps of providing an array of adaptive multi-tap finite response filters (FIRs), and using each FIR to filter a different one of acceleration signals.

6. The method of claim 5, in which the generating step (c) further comprises a step of using the plant estimate and the externally generated vibration to adaptively select tap weights for the FIRs during operation of the disc drive.

7. The method of claim 1, in which the using step (d) comprises steps of generating a current command signal in response to the position error signal to remove head position error, combining the compensation signal with the current command signal to form a compensated current command signal, and using the compensated current command signal to adjust current applied to an actuator motor to adjust the position of the head.

8. A disc drive configured to attenuate effects of externally generated vibration applied along multiple axes of the disc drive, comprising:
   a base deck;
   a rotatable disc supported by the base deck with a recording surface on which a plurality of concentric data tracks are defined;
   a read/write head adjacent the recording surface;
   an actuator motor which controllably moves the head relative to the recording surface;
   a servo circuit, coupled to the head, which generates a position error signal indicative of head position error in relation to detected head position and desired head position, the servo circuit determining a plant estimate indicative of transfer function response of the disc drive while the disc drive is operated off-line;
   a sensor network coupled to the base deck and comprising a plurality of vibration sensors, each vibration sensor configured to generate an acceleration signal along a corresponding axis of the disc drive, each acceleration signal indicative of a different component of the externally generated vibration applied along the corresponding axis of the disc drive; and
   an adaptive filter network coupled to the sensor network and comprising a plurality of filters arranged in parallel, each filter adaptively filtering a selected one of the acceleration signals to generate a filtered acceleration signal in response to the plant estimate and the externally generated vibration, the adaptive filter network combining the filtered acceleration signal to generate a compensation signal which is used by the servo circuit to reduce head position error induced by the externally generated vibration.

9. The disc drive of claim 8, in which the servo circuit further generates a current command signal in response to the position error signal, combines the current command signal with the compensation signal to generate a compensated current command signal, and uses the compensated current signal to apply current to the actuator motor to nominally remove the head position error.

10. The disc drive of claim 8, in which the array of vibration sensors comprises first, second and third vibration sensors, the first vibration sensor aligned along an axis corresponding to a length of the disc drive, the second vibration sensor aligned along an axis corresponding to a width of the disc drive, and the third vibration sensor aligned nominally parallel to a selected one of the first or second vibration sensors so that translational acceleration components of the externally generated vibration are detected by the first and second vibration sensors and a rotational acceleration component of the externally generated vibration is detected by the third vibration sensor and the selected one of the first or second vibration sensors.

11. The disc drive of claim 8, in which the array of vibration sensors comprises first and second vibration sensors, the first vibration sensor aligned nominally parallel to the second vibration sensor so that both a translational acceleration component and a rotational acceleration component of the externally generated vibration are detected by combined operation of the first and second vibration sensors.

12. The disc drive of claim 8, in which each adaptive filter comprises an adaptive multi-tap finite response filter (FIR) having tap weights selected in response to the plant estimate and the externally generated vibration to attenuate the corresponding component of the externally generated vibration along the corresponding axis.

13. A disc drive, comprising:

a base deck;

an actuator motor which controllably moves a transducer head relative to a disc recording surface; and means for attenuating effects of externally generated vibration applied along multiple axes of the disc drive, including means for concurrently generating a plurality of acceleration signals along each of a corresponding plurality of different axes of the disc drive, each acceleration signal indicative of a different component of the externally generated vibration applied along the corresponding axis of the disc drive, and means for adaptively filtering each of the acceleration signals.

* * * * *